United States Patent [19]

Flickinger et al.

[11] 4,240,781
[45] Dec. 23, 1980

[54] INJECTION MOLDING MACHINE HAVING DUAL TONNAGE TRAVERSING CYLINDER

[75] Inventors: William T. Flickinger, Marion; Donald W. Staiger, Mount Gilead, both of Ohio

[73] Assignee: HPM Corporation, Mount Gilead, Ohio

[21] Appl. No.: 970,102

[22] Filed: Dec. 18, 1978

[51] Int. Cl.² .......................... B29C 1/16; B29F 1/00
[52] U.S. Cl. ............... 425/450.1; 425/451.2; 425/590
[58] Field of Search ............... 425/450.1, 451.2, 451.7, 425/451.9, 450, 589, 590, 594, 595, DIG. 221, DIG. 223

[56] References Cited

U.S. PATENT DOCUMENTS

| | | | |
|---|---|---|---|
| 2,689,978 | 9/1954 | Roger | 425/DIG. 223 |
| 3,093,863 | 6/1963 | Ehlert | 425/451.2 X |
| 3,156,014 | 11/1964 | Wenger | 425/589 |
| 3,663,140 | 5/1972 | Hehl | 425/590 X |
| 3,687,590 | 8/1972 | Cyriox | 425/594 X |
| 4,005,974 | 2/1977 | Sgabo | 425/450.1 |
| 4,017,236 | 4/1977 | Penkman et al. | 425/450.1 X |
| 4,021,181 | 5/1977 | Hehl | 425/450.1 |
| 4,025,266 | 5/1977 | Linde et al. | 425/451.7 X |
| 4,032,277 | 6/1977 | Linde et al. | 425/451.7 X |
| 4,105,385 | 8/1978 | Hehl | 425/450.1 X |
| 4,111,629 | 9/1978 | Nussbaumer | 425/451.2 |
| 4,158,327 | 6/1979 | Aoki | 425/451.2 X |

FOREIGN PATENT DOCUMENTS 7131149 7/1972 France .......................... 425/DIG. 221

Primary Examiner—J. Howard Flint, Jr.
Attorney, Agent, or Firm—Albert L. Jeffers; John F. Hoffman

[57] ABSTRACT

An injection molding machine having a dual tonnage traversing cylinder whereby extended stroke mold breakaway force may be exerted by the traversing cylinder unit before it begins its higher speed traversing movement to completely open the mold. The traversing cylinder comprises a normal length piston received within the cylinder barrel and bolted at one end to the moveable platen. The effective working area of the pressure face for this piston during the retraction stroke is such that low force, high speed retraction of the mold section connected to the moveable platen may be achieved. Also disposed within the barrel is a breakaway piston, which may be annular in shape and disposed concentrically with respect to the fast traverse piston and positioned such that it will abut an annular shoulder on the fast traverse piston throughout the retraction stroke of the breakaway piston. The effective working area of the pressure face for the breakaway piston is considerably larger than that of the fast transverse piston so that much greater breakaway force can be exerted on the moveable platen during the early stage of mold separation after the initial, short distance breakaway force is exerted by the main cylinders.

11 Claims, 14 Drawing Figures

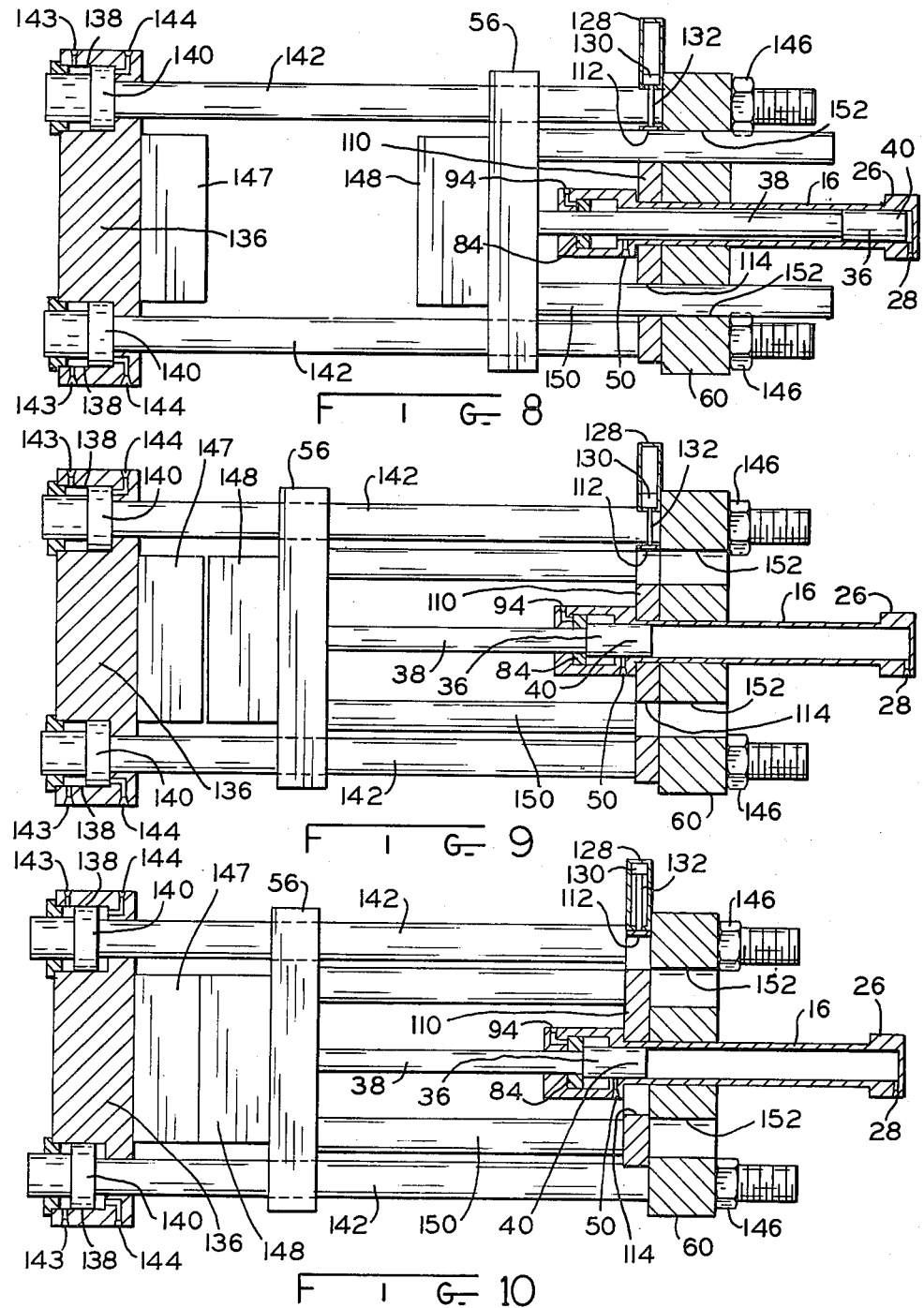

INJECTION MOLDING MACHINE HAVING DUAL TONNAGE TRAVERSING CYLINDER

BACKGROUND OF THE INVENTION

The present invention is related to an injection molding machine, and in particular to the traversing cylinder for such a machine, which is capable of developing dual tonnage during mold separation.

In one well-known type of injection molding machine, a pair of die sections are connected, respectively, to a stationary platen and a moveable platen, the latter being supported for rectilinear movement on a plurality of strain rods, preferably four in number, and being rigidly connected to the stationary platen. The moveable platen is advanced and retracted with respect to the stationary platen by means of a traversing cylinder, which is supported on the backplate, the latter being rigidly connected to the strain rods and extending generally parallel to the moveable platen and stationary platen. The traversing cylinder comprises a cylinder barrel having a piston or plunger slidably received therein for rectilinear movement under the action of pressurized hydraulic fluid admitted into the cylinder barrel on opposite sides of the piston head. The forward end of the piston is connected to the moveable platen so that as the piston is advanced and retracted in the cylinder barrel, the moveable platen and the mold section carried thereby are moved toward and away from the stationary platen and its mold section.

In conventional prior art machines, the final clamping tonnage is achieved by a plurality of main cylinders associated with the stationary platen, which act through the strain rods, backplate, lockplate and compression columns to pull the moveable platen forwardly such that the mold sections are tightly clamped together with maximum holding force. After molding, a considerably large force is necessary to break the mold halves apart, and this is accomplished by the main cylinders, which retract the moveable platen slightly.

Since the piston size of the main cylinders is determined by the clamp tonnage for the machine, this is essentially the amount of tonnage which is available for developing the breakaway force needed to separate the mold halves. Because of machine design, this high breakaway force is only available for a very short distance, typically one-half inch, with some machines capable of up to two inches of breakaway force.

In certain molding operations, however, because of the particular product which is being molded, breakaway force over greater distances than this is needed. Although the standard traversing cylinder could be overbuilt so that high breakaway force could be exerted, this force is not necessary over the full reverse travel of the piston because during much of its travel, all that is necessary is to separate the mold sections sufficiently to enable removal of the molded article. Furthermore, high forces during retraction of the traversing piston require a much longer cycle time because a much greater volume of hydraulic fluid must be pumped into the cylinder barrel. Obviously, this is inefficient in terms of machine usuage and energy consumption.

SUMMARY OF THE INVENTION

To overcome the problems discussed above, the present invention has, as one of its objects, the provisions of an injection molding machine, or similar apparatus, in which the traversing cylinder comprises a dual piston arrangement wherein the moveable platen is retracted at low speed and high tonnage for a relatively short stroke during breakaway, and is then retracted at high speed and low tonnage during the remainder of the stroke. The fast traverse cylinder is advanced throughout its entire stroke by means of relatively low tonnage fluid pressure admitted to the cylinder barrel behind it. Breakaway tonnage is accomplished by means of a second piston, having a much larger effective working area than the fast traverse piston, which is carried forward prior to the mold opening operation and is retracted over its relatively short stroke with high tonnage force. It engages the fast traverse piston during its short stroke and then becomes inoperative during the final retraction of the traverse piston.

The advantages to this arrangement include the fact that high breakaway tonnage need be developed for only a relatively short stroke, for example, eight inches, so that the smaller working area piston may be rapidly traversed after the mold sections have been separated by a sufficient distance. Thus, energy is utilized efficiently and the machine is able to cycle rapidly.

Specifically, the present invention comprises an injection molding machine having a moveable platen adapted to be connected to a die section, wherein the improvement lies in the traversing cylinder which comprises: a cylinder barrel, means for fixing the barrel against axial movement relative to the platen, piston means slidably received in the barrel, means for connecting the piston to the platen, the piston including a first pressure face and a second pressure face distinct from the first pressure face, wherein the first pressue face has a larger effective working area than the second pressure face. Means are provided for admitting fluid into the cylinder barrel in front of the first pressure face, as are means for admitting fluid under pressure into the cylinder barrel in front of the second pressure face. Both of the pressure faces are oriented such that they retract the piston means when fluid under pressure is admitted into the cylinder barrel in front of the respective pressure faces.

BRIEF DESCRIPTION OF THE DRAWINGS

FIG. 1a is a fragmentary sectional view of the forward end of the traversing cylinder of FIG. 1 attached to the moveable platen;

FIG. 8 is a diagrammatic view showing the injection molding machine in the fully retracted position;

FIG. 9 is a diagrammatic view of the injection molding machine almost fully extended but prior to the application of final clamping force;

FIG. 10 is a diagrammatic view of the injection molding machine in its clamped position;

DETAILED DESCRIPTION

Figure 1:
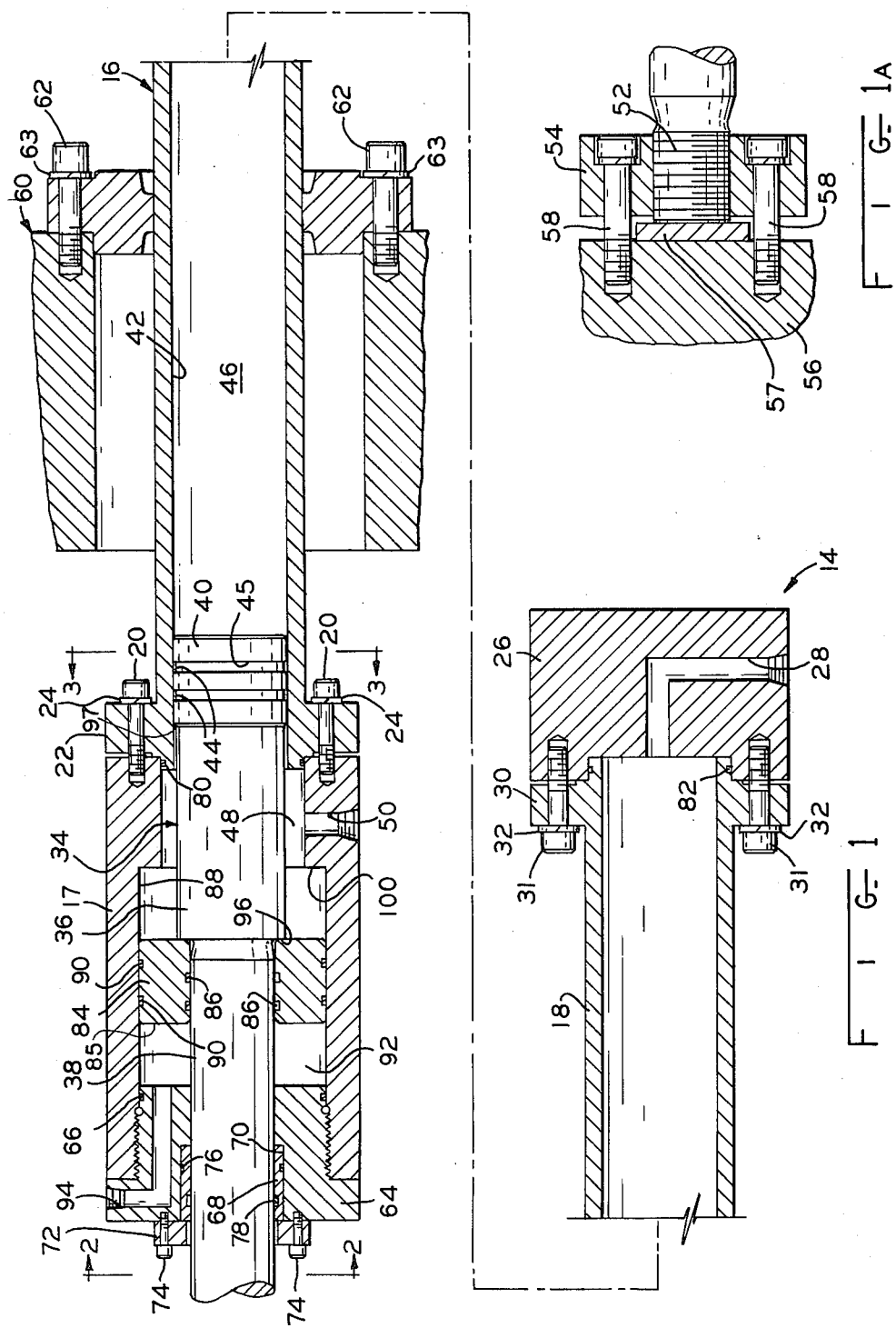
FIG. 1 is a longitudinal sectional view of the traversing cylinder according to the present invention.
Figure 2:
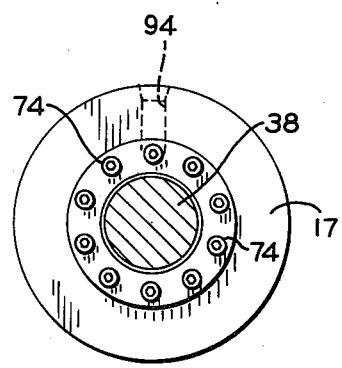
FIG. 2 is a sectional view taken along line 2—2 of FIG. 1 and viewed in the direction of the arrows.
Figure 3:
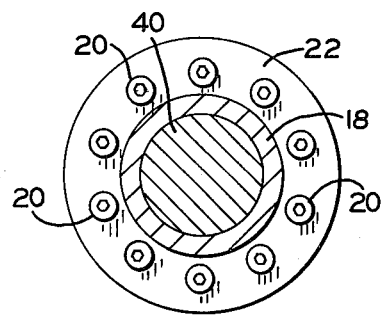
FIG. 3 is a sectional view taken along line 3—3 of FIG. 1 and viewed in the direction of the arrows.

Referring now to the drawings in detail, a traversing cylinder 14 constructed in accordance with the present invention is illustrated. Cylinder 14 comprises a two-part cylinder barrel 16 having front breakaway cylinder portion 17 and a rear fast traverse cylinder portion 18, respectively, connected together by screws 20 extending through flange portion 22 of rear portion 18. Lock washers 24 are compressed between the heads of screws 20 and flange 22. Rear cylinder head 26, which includes forward traversing inlet port 28, is connected to the rear flange 30 of cylinder barrel rear portion 18 by screws 31, which are tightened against lock washers 32.

Slidably received within cylinder barrel 16 is fast traverse piston or ram 34 having a rear portion 36, reduced diameter forward portion 38, and a piston head 40, the latter being dimensioned to fit closely against the inner wall 42 of cylinder barrel rear portion 18. Annular seals 44 are disposed within grooves 45 on piston head 40 and serve to form a fluid-tight forward traverse expansible chamber 46 behind piston head 40 and a fluid-tight expansible chamber 48 in front of head 40, the latter being supplied with fluid under pressure through fast traverse inlet port 50.

The distal end 52 of fast traverse piston or ram 34 is threadedly secured to flange 54, which is connected to moveable platen 56 by screws 58. Spacer 57 is disposed between platen 56 and piston 34. Cylinder barrel 16 is connected to backplate 60 by screws 62, which are tightened against lock washers 63. Front flange 64 is threaded into the front section 17 of cylinder barrel 16, which is sealed by seal 66. Bearing 68 is received within a counterbore 70 and held therein by bearing retaining ring 72, the latter being connected to flange 64 by screws 74. Seals 76 and 78 render the interface between bearing 68 and flange 64 and the interface between bearing 68 and piston reduced diameter portion 38 fluid-tight.

Seals 80 and 82 seal the interfaces between cylinder barrel front and rear portions 17 and 18 and between rear portion 18 and rear cylinder head 26, respectively.

Disposed within the front portion 17 of cylinder barrel 16 concentrically around the reduced diameter portion 38 of piston 34 is an annular breakaway piston 84 having a pressure face 85. A fluid-tight interface between breakaway piston 84 and the reduced diameter portion 38 of piston 34 is provided by seals 86, and a fluid-tight interface between breakaway piston 84 and the inner wall 88 of cylinder barrel forward portion 17 is achieved by seals 90. Thus, a fluid-tight expansible chamber 92 is formed between piston 84 and front flange 64, and a fluid-tight expansible chamber 48 is formed between piston 84 and fast traverse piston head 40. Hydraulic fluid is admitted to and exhausted from expansible chamber 92 through breakaway inlet port 94, the latter being alternatively connected to a source of hydraulic fluid under pressure, and a hydraulic exhaust or sump line. As will be seen, breakaway piston 84 abuts the forwardly facing shoulder 96 on piston 34 as breakaway piston 84 is retracted.

Although the size of traversing cylinder 14 will depend upon the size of the injection molding machine, following are exemplary dimensions. Fast traverse piston 34 has a stroke of 65.0 in., piston head 40 is 7.0 in. in diameter, and the reduced diameter portion thereof 38 is 5.0 in. in diameter. The rear portion 18 of cylinder barrel 16 is 7.0 in. in diameter, and the forward portion 17 thereof is 11.0 in. in diameter. Breakaway piston 84 has an outer diameter of 11.0 in., an inner diameter of 5.0 in., and a stroke between front flange 64 and shoulder 100 of 8.0 in.

Figure 5:
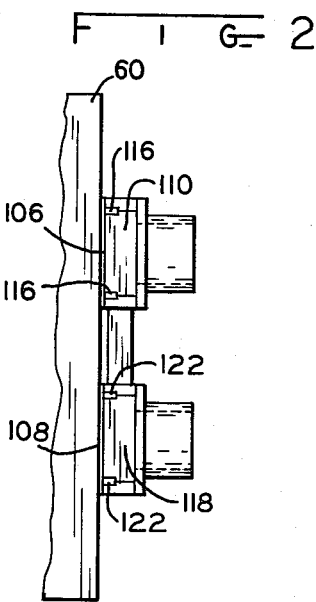
FIG. 5 is a side elevational view of the backplate and lock plate for the injection molding machine.
Figure 6:
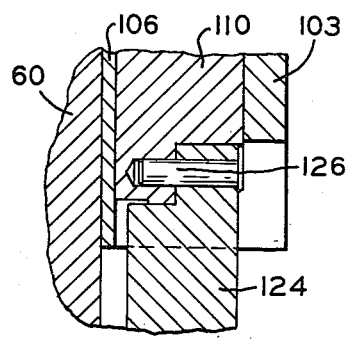
FIG. 6 is an enlarged sectional view taken along line 6—6 of FIG. 4 and viewed in the direction of the arrows.
Figure 7:
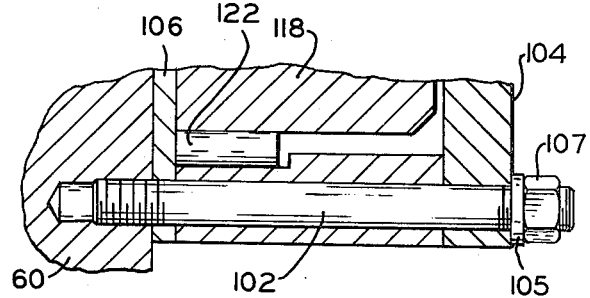
FIG. 7 is an enlarged sectional view taken along line 7—7 of FIG. 4 and viewed in the direction of the arrows.

Referring now to FIGS. 5 through 7, the lock plate for the injection molding machine will be described. Connected to back plate 60 by dowel pins 102, lock washers 105 and nuts 107 are upper and lower slide lock plate housings 103 and 104, respectively. Upper and lower wear plates 106 and 108 are clamped between housings 103 and 104 and backplate 60. Upper lock plate 110, which is provided with openings 112 and 114 dimensioned to receive the compression columns to be described below, is slidably received in upper housing 103 for horizontal rectilinear movement. Bearings 116 provide the sliding support for lock plate 110. Lower lock plate 118, which is provided with openings 119 and 120 dimensioned to receive the compression columns to be described below, is slidably received within lower housing 104 for rectilinear movement in the horizontal direction. Bearings 122 provide the sliding support for lower lock plate 118.

Figure 4:
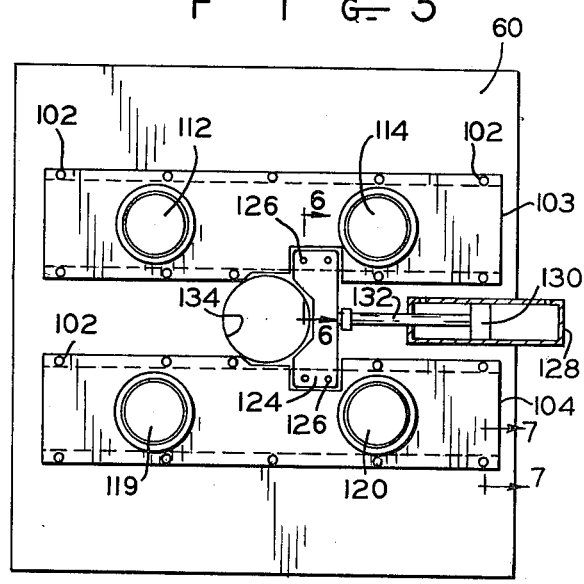
FIG. 4 is a front elevational view of the backplate and lock plate.

Tie bar slide lock 124 is connected to upper and lower lock plates 110 and 118 by dowels 126 and is capable of sliding movement in the horizontal direction behind housings 103 and 104. Tie bar 124 is traversed by means of slide lock cylinder 128, which comprises piston 130 connected to tie bar 124 by connecting rod 132. Traversing cylinder barrel 16 extends through opening 134 in back plate 60. In a known manner and as will be described below, lock plates 110 and 118 are pulled to the right as viewed in FIG. 4 so as to block openings 112, 114, 119 and 120 during the exertion of the final clamping tonnage by the main cylinders.

With reference to FIGS. 8 through 13, the portion of the injection molding machine constructed in accordance with the present invention and the operation thereof are illustrated diagrammatically. The machine comprises a stationary platen 136 having four main cylinders 138 therein, with each cylinder 138 including a main piston 140 to which are attached, respectively, four strain rods 142. Hydraulic fluid under pressure is admitted to cylinders 138 on opposite sides of pistons 140 through ports 143 and 144.

Strain rods 142 pass through moveable platen 56 and are secured to back plate 60 by means of nuts 146. Die sections 147 and 148 are mounted to stationary platen 136 and moveable platen 56, respectively. Compression columns 150 are mounted to moveable platen 56 and are received in clearance holes 112, 114, 119 and 120, respectively, in lock plates 110 and 118.

At the start of the molding sequence, moveable platen 56 is fully retracted to the position shown in FIG. 8 by admitting hydraulic fluid under pressure through port 150. This retracts fast traverse piston 34 and moves breakaway piston 84 forward. In this position, it will be noted that the compression columns 150 are received within clearance holes 112, 114, 119 and 120.

Moveable platen 56 is advanced to the position where die sections 147 and 148 are almost closed (FIG. 9) by admitting hydraulic fluid under pressure through port 28. Final clamping tonnage is developed by actuating lock plate cylinder 128 to shift lock plates 110 and 118 so that the clearance holes 152 in back plate 60 are covered, and then admitting hydraulic fluid under pressure through ports 144 to act against main pistons 140. This will pull strain rods 142 and backplate 60 forwardly so that lock plates 110 and 118 exert force against compression columns 150. Columns 150, in turn, exert final clamping tonnage on mold sections 147 and 148 through moveable platen 56 (FIG. 10).

Figure 12:
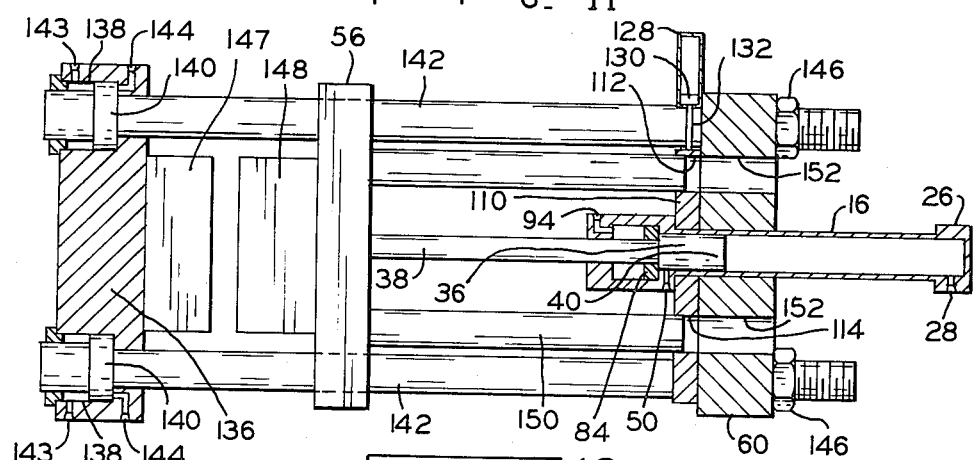
FIG. 12 is a diagrammatic view of the injection molding machine wherein the die sections have been fully retracted in the breakaway stage of unclamping.

To separate mold sections 147 and 148, hydraulic fluid under pressure is admitted through ports 143 against main pistons 140 so as to separate the mold sections 147 and 148 slightly to the position shown in FIG. 9. Prior to this time, lock plates 110 and 118 are shifted by cylinder 128 so that their openings 112, 114, 119 and 120 are in alignment with clearance holes 152. Then, hydraulic fluid under pressure is admitted through port 94 against the pressure face 85 of breakaway piston 84 so that it is shifted rearwardly, carrying with it fast traverse piston 34 due to the abutment between breakaway piston 84 and the annular shoulder 96 on fast traverse piston 34. Since the effective working area of breakaway piston 84 is considerably larger than that of fast traverse piston 34, very high breakaway tonnage can be developed over the entire stroke of breakaway piston 84 from the position shown in FIG. 10 to the end of its stroke as illustrated in FIG. 12. As mentioned earlier, the available stroke for breakaway piston 84 may be eight inches, for example.

At this point, pressurized hydraulic fluid is diverted from port 94 and is admitted through port 50 against the effective pressure face 96, 97 of fast traverse piston 34. Since piston 34 has an effective working area which is considerably smaller than that of breakaway piston 84, for example twice or three times as large, it will be traversed much more rapidly and with lower tonnage. Since the mold halves have already been separated, the higher tonnage developed by breakaway piston 84 is not needed.

Figure 11:
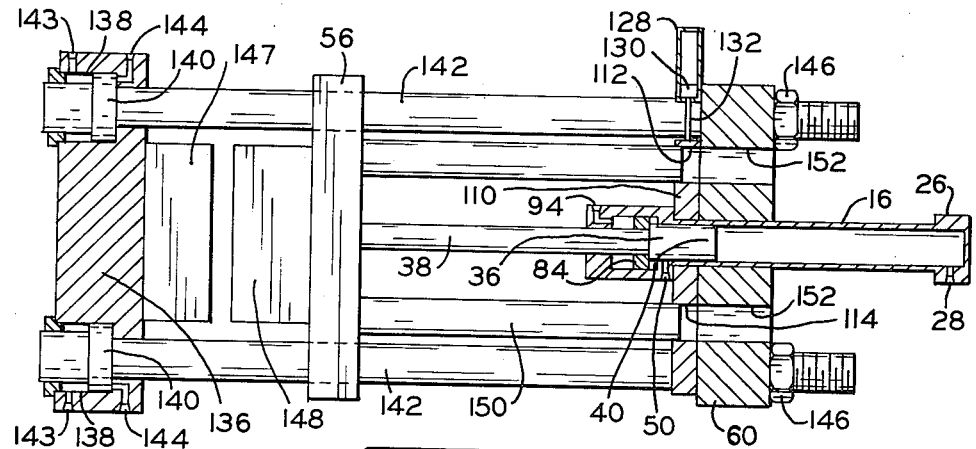
FIG. 11 is a diagrammatic view of the injection molding machine with the die sections partially retracted by the breakaway piston.
Figure 13:
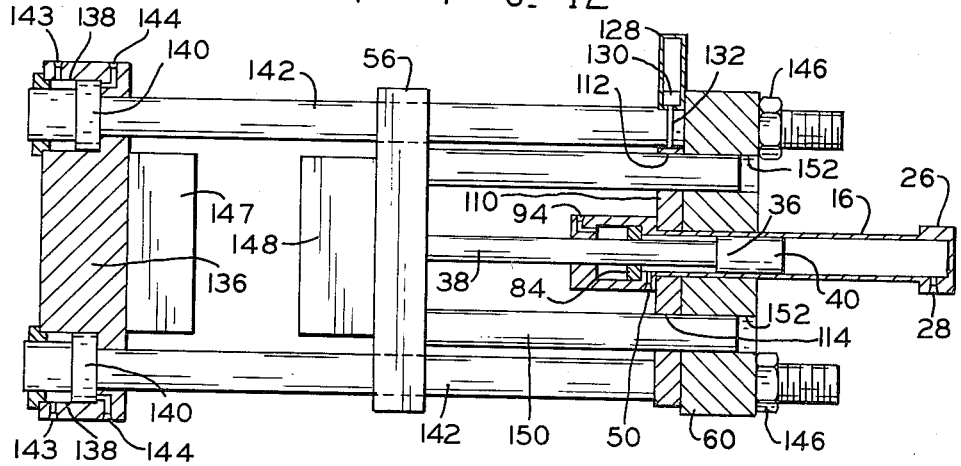
FIG. 13 is a diagrammatic view of the injection molding machine showing the die sections partially retracted by the fast traverse piston.

When the machine is in the position illustrated in FIG. 10, the injector unit (not shown) injects a charge of molten plastic material into mold sections 147 and 148. After curing of the plastic material, the mold opening steps shown in FIGS. 11, 12 and 13 are accomplished and the molded article is then removed from the mold. At this point, the aforementioned cycle may be repeated with an identical molded article produced.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In combination with an injection molding machine having a movable platen adapted to be connected to a die section, a traversing apparatus comprising:

a cylinder barrel having a first cylinder and a second cylinder,
   means connected to said barrel for fixing said barrel against axial movement,
   an annular first piston means slidably received in said first cylinder, said first piston means including a first pressure face and an opening extending axially through said piston means,
   a second piston means slidably received in said second cylinder and having a second pressure face smaller than said first pressure face, said second piston means including a reduced diameter portion slidably extending through the opening in said first piston means such that the pressure face of said first piston means encircles said reduced diameter portion, said first piston means being sealed against said reduced diameter portion,
   said first piston means being connected to said platen,
   first means for admitting fluid under pressure into said first cylinder in front of said first piston means pressure face to retract said first piston means,
   second means for admitting fluid under pressure into said second cylinder in front of said second piston means pressure face to retract said second piston means,
   said first piston means having a much shorter available stroke than said second piston means,
   said first piston means being positioned to abut said second piston means during the retraction of said first piston means so as to partially retract said second piston means, and
   said second piston means being independently movable relative to said first piston means during at least a portion of the stroke of said second piston means.

2. The combination of claim 1 wherein the effective working area of said first pressure face is at least three times as large as the effective working area of said second pressure face.

3. The combination of claim 1 wherein the effective working area of said first pressure face is at least twice as large as the effective working area of said second pressure face.

4. The combination of claim 1 wherein said first piston means has a stroke which is greater than two inches.

5. The combination of claim 1 wherein said first piston means has a stroke which is greater than four inches.

6. The combination of claim 1 wherein said first piston means has an available stroke greater than two inches.

7. The combination of claim 1 wherein said first piston means has an available stroke greater than six inches.

8. The combination of claim 1 wherein said second pressure face is formed as an annular shoulder on said second piston means, and said first piston means abuts said annular shoulder during retraction.

9. The combination of claim 8 wherein said first piston means is positioned concentrically around the reduced diameter portion of said second piston means.

10. The combination of claim 1 wherein said first and second cylinders are in open communication with each other.

11. The combination of claim 1 wherein said first and second means for admitting fluid under pressure are independently controllable so that said first piston means can be retracted through a portion of its available stroke before said second piston means is retracted by hydraulic pressure on its pressure face.

* * * * *